United States Patent
Farr et al.

(10) Patent No.: US 8,450,863 B2
(45) Date of Patent: May 28, 2013

(54) OUTLET BOX FOR POWER GENERATOR AGGREGATE MOUNTED ON A FRAME TO ATTENUATE VIBRATION AND OSCILLATION

(75) Inventors: Wolfgang Farr, Friedrichshafen (DE); Todd Riemann, Amboy, MN (US); Kurt Snaza, Mankato, MN (US)

(73) Assignee: MTU Friedrichshafen GmbH, Friedrichshafen (DE)

( * ) Notice: Subject to any disclaimer, the term of this patent is extended or adjusted under 35 U.S.C. 154(b) by 605 days.

(21) Appl. No.: 12/717,185

(22) Filed: Mar. 4, 2010

(65) Prior Publication Data

US 2011/0215591 A1    Sep. 8, 2011

(51) Int. Cl.
*F02B 63/04* (2006.01)
*H02B 1/00* (2006.01)

(52) U.S. Cl.
CPC ........................................ *H02B 1/00* (2013.01)
USPC .......... 290/1 A; 174/520; 174/17 R; 361/600; 361/641; 361/724; 361/730; 312/223.1; 312/223.6; 220/3.2; 220/3.92

(58) Field of Classification Search
CPC ..................................... H02B 1/00; H02B 1/52
USPC ........... 248/678, 638, 906; 312/223.1, 223.6, 312/223.2; 174/50, 520, 17 R; 361/600, 361/641, 724, 730; 290/1 A; 220/3.2, 9.92, 220/3.94
See application file for complete search history.

(56) References Cited

U.S. PATENT DOCUMENTS

| | | | | |
|---|---|---|---|---|
| 1,628,889 | A * | 5/1927 | Krantz | 361/641 |
| 2,317,667 | A * | 4/1943 | Chandler | 200/50.13 |
| 3,786,312 | A * | 1/1974 | Roussard | 361/643 |
| 5,419,629 | A * | 5/1995 | Korinsky | 312/263 |
| 5,642,702 | A * | 7/1997 | Kouchi et al. | 123/198 E |
| 5,880,931 | A * | 3/1999 | Tilton et al. | 361/690 |
| 2005/0263669 | A1 | 12/2005 | Murarescu et al. | |
| 2011/0057454 | A1 * | 3/2011 | Kawakita et al. | 290/1 A |

* cited by examiner

*Primary Examiner* — Kimberly Wood
(74) *Attorney, Agent, or Firm* — Rader, Fishman & Grauer, PLLC

(57) ABSTRACT

A vibration dampened power generation aggregate including an internal combustion engine, generator and outlet box mounted upon a frame having vibration dampening mounts for the power generation aggregates. The outlet box as an interior space divided into compartments for the placement of accessories, switches and generator governors. The frame has a first side and a second side and the power generation aggregate is mounted on the frame such that the mass of the power generation aggregate is evenly distributed on the first and second sides to reduce harmonic vibration and sound transmission of the power generation aggregate on the frame during aggregate operation.

14 Claims, 5 Drawing Sheets

OUTLET BOX FOR POWER GENERATOR AGGREGATE MOUNTED ON A FRAME TO ATTENUATE VIBRATION AND OSCILLATION

TECHNICAL FIELD

Generally, an internal combustion engine power generator aggregate is used on an as needed basis, and serves as a backup power source in the event of the loss of the public current network. For example, facilities wherein computers are used for storage of data or for constant access are especially well suited to be equipped with power generation aggregate including an internal combustion engine. However, the use of such power generation aggregates has been associated with certain challenges. These challenges include amelioration of the noise and vibration associated with the continuous use of such power generation aggregates.

As seen in Murarescu et al., U.S. Patent Application Publication 2005/0263669, incorporated herein by reference as if fully set forth, it had been generally believed that a frame consisting of a longitudinal and transverse frame members which are used as bearing units, the frame is equipped with bearing mounts for the frame to be mounted to a surface, such as, for example, a building roof, and further equipped with aggregate bearing mounts vertically arranged one upon the other, and the frame areas between the frame bearing mounts and the aggregate bearing mounts are made of a vibration adsorbing material in the form of blocks so as to provide a lightweight frame in a simple and economical manner and ensure efficient attenuation of vibrations. Such a frame is indeed very effective at attenuation of vibration. However, it has been observed that additional measures could be taken to reduce the oscillation or harmonic vibration, of a power generation aggregate mounted upon such frames because of the need to attenuate oscillation for the entire power generation aggregate during operation.

It is an object of the present disclosure to address the attenuation of oscillation felt over a power generation aggregate during operation to more completely attenuate the noise and vibrations felt during the use of a power generation aggregate in a way that is simple, economical and easily manufacturable. This and other objects may be readily understood upon reading the following description of the embodiments included in the disclosure.

SUMMARY

In one embodiment, the disclosure includes a vibration dampened power generation aggregate. The power generation aggregate may comprise a frame defining a first side and a second side, and comprised of longitudinal members having a length and oriented in a first direction. The frame further includes at least one transverse member extending in a second direction between said longitudinal members. The frame may be supported by frame bearings and equipped with aggregate bearings supported on a vibration dampening material to insulate said aggregate bearings from said frame. The aggregate bearings and the frame bearings are preferably disposed vertically relative to each other and further equipped with vibration dampening material interposed between the frame bearings and the aggregate bearings.

A power generation aggregate, or any other aggregate that imparts rotary action along its length, is mounted on the frame. The power generation aggregate may be comprised of an internal combustion engine mounted on at least some of the aggregate bearings. The engine is generally operable to impart rotary motion to an electrical generator coupled to the engine. The generator is mounted on at least some of the aggregate bearings. The aggregate further includes an outlet box having a front panel and back panel in spaced apart relation relative to each other and having opposed sidewall panels extending substantially there between to define an interior space. At least one of the outlet panels may have an aperture therein to admit at least a part of the generator into the interior space formed by the outlet box. The outlet box interior space may be further divided into compartments for the placement of accessories, switches and governors for the power generation aggregate.

The engine, generator and outlet box are mounted on at least some of said aggregate bearings on the frame such that the power generation aggregate has a mass substantially evenly distributed between the first side and the second side along substantially the length of the frame to substantially reduce harmonic vibration and sound transmission of the power generation aggregate on the frame during aggregate operation.

In another embodiment, this disclosure includes an outlet box for use in a power generation aggregate comprising a front panel and a back panel in spaced apart relation to each other, opposed side panels in opposition to each other and extending between the front and back panel to define an interior space. The front panel may be equipped with an aperture to admit at least a part of a power generation aggregate to the interior space, and the side panels may be further equipped with at least one compartment for accessories, power switches and governor switches to be positioned in the outlet box such that the outlet box center of mass is evenly distributed along a first side and a second side of a vibration frame. The outlet box may be mounted upon a vibration frame supported by frame bearings and equipped with aggregate bearings supported on a vibration dampening material to insulate the aggregate bearings from the frame. The aggregate bearings and the frame bearings may be generally disposed vertically relative to each other and may be further equipped with vibration dampening material interposed between the frame bearings and the aggregate bearings with a vibration dampening material interposed between the frame bearings and the aggregate bearings.

DETAILED DESCRIPTION

Figure 1:
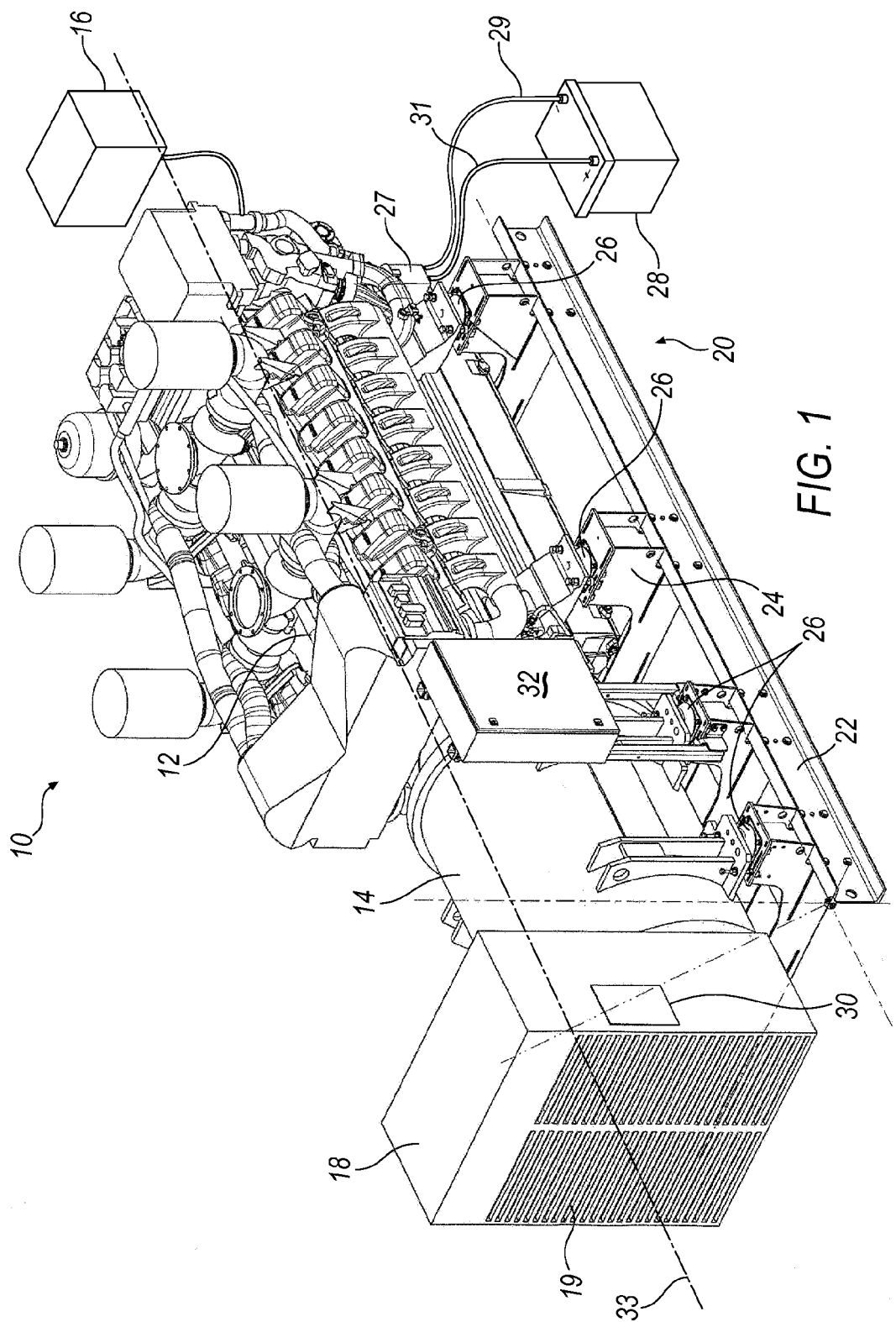
FIG. 1 is a schematic representation of a power generation aggregate on a frame according to the prior art.

Turning now tot the drawings wherein like numbers refer to like structures, and particularly to FIG. 1, there is depicted therein a schematic representation of a power generation aggregate representative of the prior art. Specifically, power generation aggregate 10 includes an internal combustion engine 12 capable of imparting rotary motion to a generator 14 which is coupled to the engine at its end 15. At the opposite end of the engine is cooling system 16 to cool the engine during operation as is well known in the art. An outlet box 18 is coupled to the generator aggregate at an end opposite the coupling with the engine.

The engine is equipped with a starter 27 connected to a battery 28 by electrical connections 29 and 31 in order to turn the engine during cranking The battery may be placed anywhere, such as a remote location or mounted on a platform attached to the frame. A panel 32 is mounted on the frame 20 for access to the engine governor switches.

The generator aggregate is a rotary electrical power generator in a housing 11 with flanges adapted to mount the generator to the engine at one end in a manner as is well known in the art.

The outlet box 18 has a front 17 and rear panel 23 in opposed spaced apart relation relative to each other and further include opposed side panels 21 and 35 and top panel 37 and bottom panel 39 to define the outlet box. The rear panel may be equipped with a louver arrangement 19 to permit circulation of air in the box interior to cool the generator. Panel 30 in a removable panel that provides access to switches in the outlet box, such as, for example, power switches to regulate the generation of power from the generator. The outlet box is mounted on a longitudinal frame member on vibration dampening aggregate bearings as are described below.

Having thus described the individual aggregates of the power generation aggregate, it can be seen that a frame 20, is comprised of at least two longitudinal members 22 in spaced apart relation to each other and oriented in a first direction are joined with transverse members 24, oriented in a second direction. The frame is said frame supported by frame bearings 25 and equipped with aggregate bearings 26 supported on a vibration dampening material 41 to insulate the aggregate bearings from the frame. The aggregate bearings and the frame bearings are disposed vertically relative to each other and further equipped with vibration dampening material 43 interposed between the frame bearings and the aggregate bearings. The frame may be seen to provide two sides to the power generation aggregate, namely a first side A and a second side B. The respective sides may be understood to be divided by centerline 33 which represents the center of mass of the frame and power generation aggregates. The frame is more fully described in Murarescu et al., U.S. Patent Application Publication 2005/0263669, incorporated by reference as if fully set forth herein.

Figure 2:
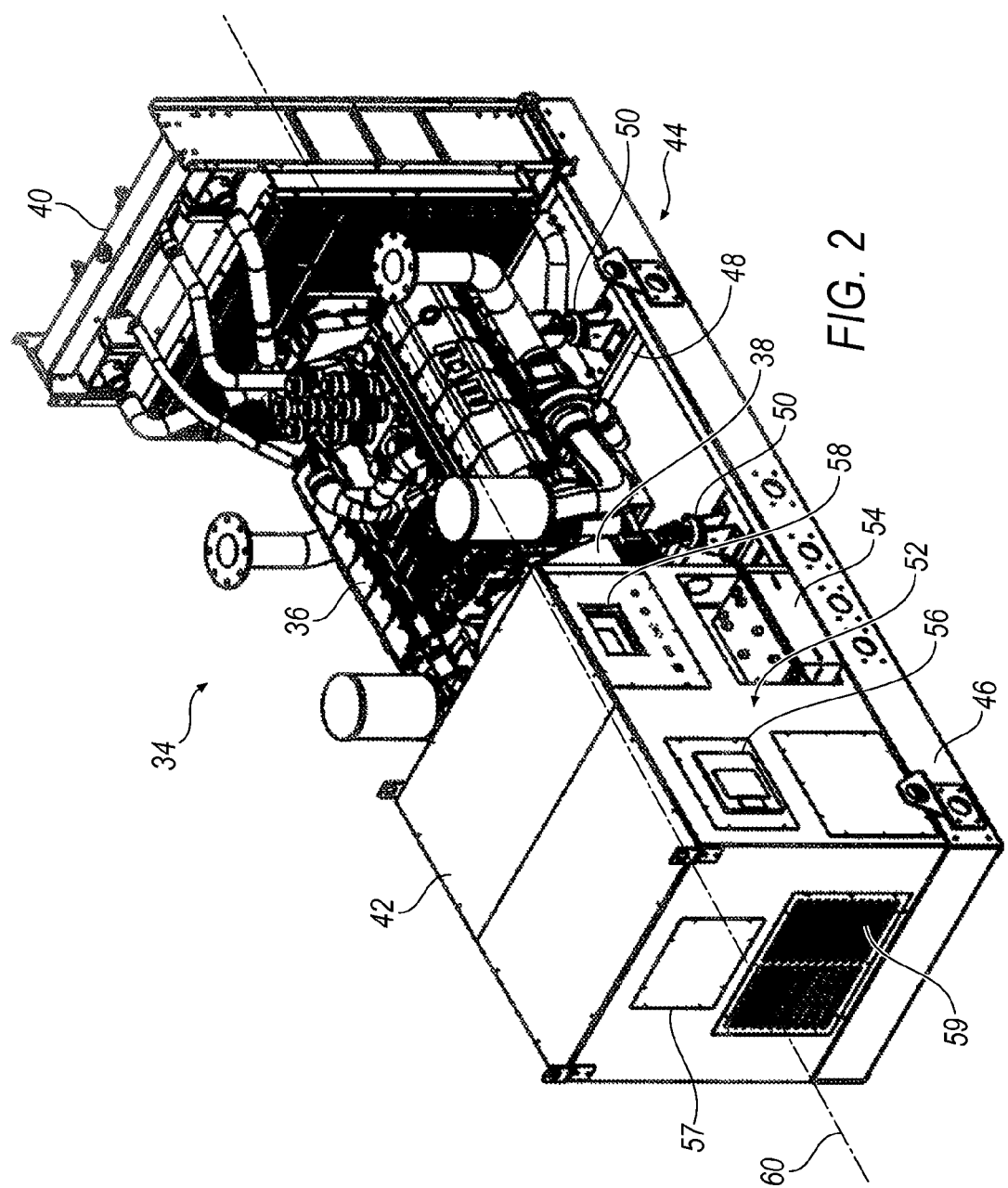
FIG. 2 is a schematic representation of a power generation aggregate on a frame exhibiting vibration and oscillation attenuation according to one embodiment of the present disclosure.

It may be understood by those skilled in the art, the system as described above may present vibration and oscillation issues because of the arrangement of the aggregates relative to each other and to the frame. It has been determined that oscillation of the power generation aggregate is an issue because the rotation of the engine and generator imparts harmonic motion to the system that may not be entirely attenuated by use of vibration absorbing materials in the aggregate bearings. Noise and vibration will build as the harmonic vibration caused by the oscillation of the system builds during operation of the power generation aggregate. The oscillation arises because the center of mass of the power generation aggregate is not evenly distributed between side A and side B through the length of the frame because the individual aggregates are not aligned such that their center of mass is evenly distributed between side A and side B. This challenge has been met by the power generation aggregate of FIG. 2.

Specifically, power generation aggregate 34 includes internal combustion engine 36 with radiator 40, generator 38 and outlet box 42 mounted on frame 44 having longitudinal frame members 46 in spaced apart relation relative to each other and oriented in a first direction to define a length, with transverse members 48 connected to the longitudinal member and extending in a second direction. The frame has a plurality aggregate bearings 50 of the same construction as that described in the aggregate bearings of FIG. 1, and the frame may be further equipped with frame bearings as described in relation to FIG. 1 above. More specifically, the frame in general is similar or of the same construction as that described in relation to FIG. 1 above.

Outlet box 42 is comprised of a top panel, a bottom panel, a back panel and a front panel in opposed spaced apart relation to each other as will be hereinafter described to define an interior space. The interior space defines a plurality of compartments 52 for the placement of accessories, such as, for example battery 54 in a manner that the battery mass is supported along the longitudinal member. The outlet box is further equipped with compartments for the placement of safety switches 56, governor 58, accessory switches 57 and ventilation louvers 59 such that the center of mass and taken along centerline 60 is substantially evenly divided between side A and side B along substantially the entire length of the frame. In addition, because the outlet box is modified to accept at least a portion of the generator in its interior space as will be hereinafter described, the overall length of the power generation aggregate can be reduced. And because the center of mass of the entire aggregate is substantially evenly divided between side a and side B, noise attenuation is enhanced and oscillation of the power generator aggregate is substantially attenuated over systems as described relative to FIG. 1.

Figure 3A:
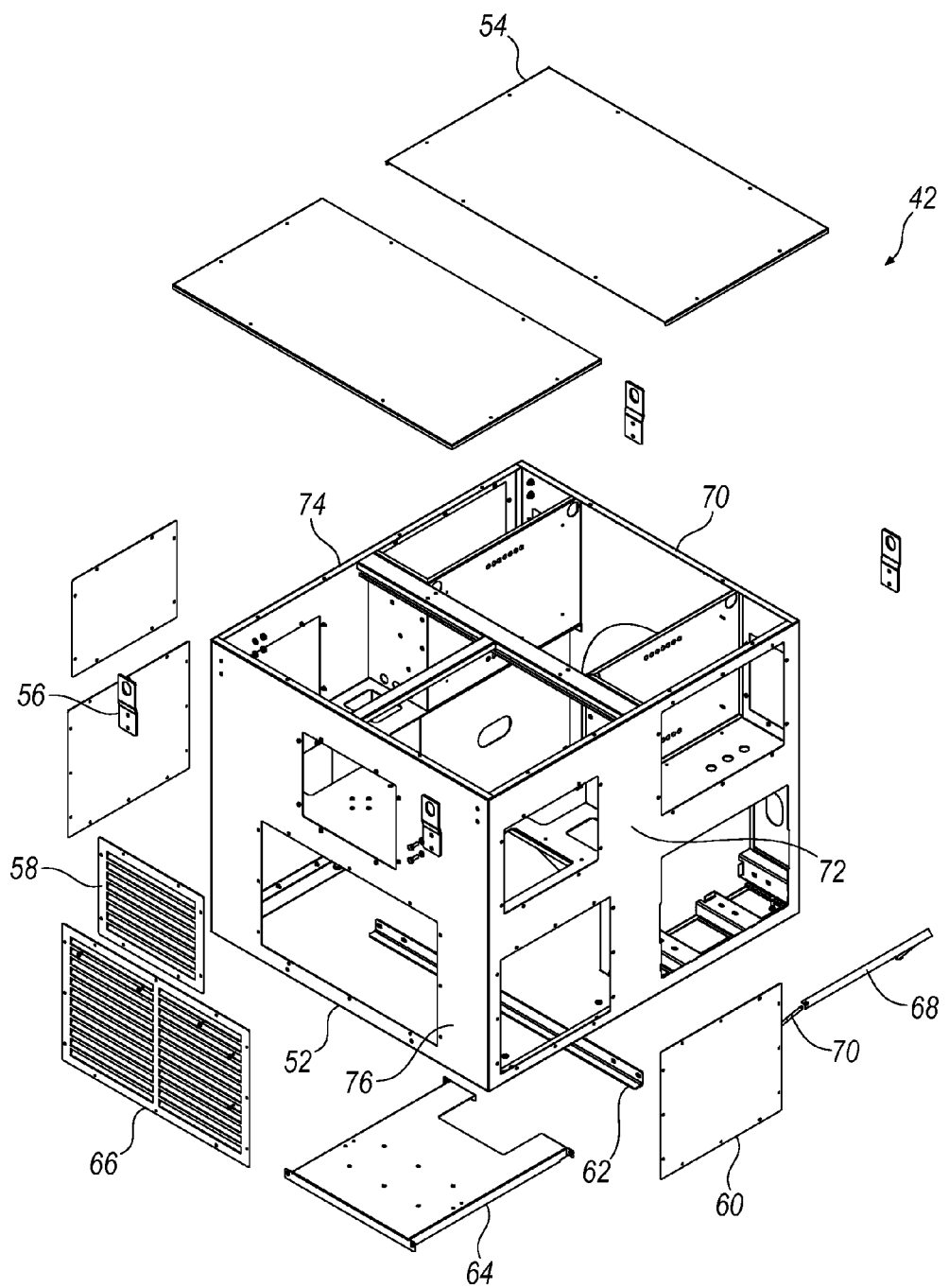
FIG. 3A is an exploded schematic representation of an outlet box according to one embodiment of the present disclosure.

FIG. 3A is an exploded schematic representation of one embodiment of the outlet box. Specifically, outlet box 42 is equipped with bottom frame 52 and top panel 54, which may be two panels as well as one panel, depending upon the division of the interior space of the outlet box. The outlet box has side panels 72 and 74 in spaced apart relation relative to each other and extending in a first direction and front panel 78 and back panel 76 in spaced apart relation relative to each other in a second direction and separating the side panels to define an interior space. There is also provided a bottom panel 64 for mounting the outlet box to the power generation aggregate frame. The outlet box has an angle mount 62 to aid in securing the outlet box to the frame. Compartment 61 is provided with panel 60 to permit access to anything paced therein, such as for example, accessory switches. Generally, as seen at 56, there is provided a bracket to mount the panel into place in the various compartments. Rear compartment 63 is provided with panel 58 to provide access to switches or components placed therein, and rear panel 76 is equipped with louvers 66 to provide ventilation to the interior space of the outlet box. As seen in FIG. 3A. the interior space of the outlet box may be divided into a plurality to compartments, and further may have an upper level of compartments 67 and a lower level of compartments 69, divided as required in order to ensure that the components placed therein will distribute their mass substantially evenly divided on side A and side B of the frame. Battery door hold down bar 68 and bolt 70 may be provided to hold down a battery placed in compartment 82.

Figure 3C:
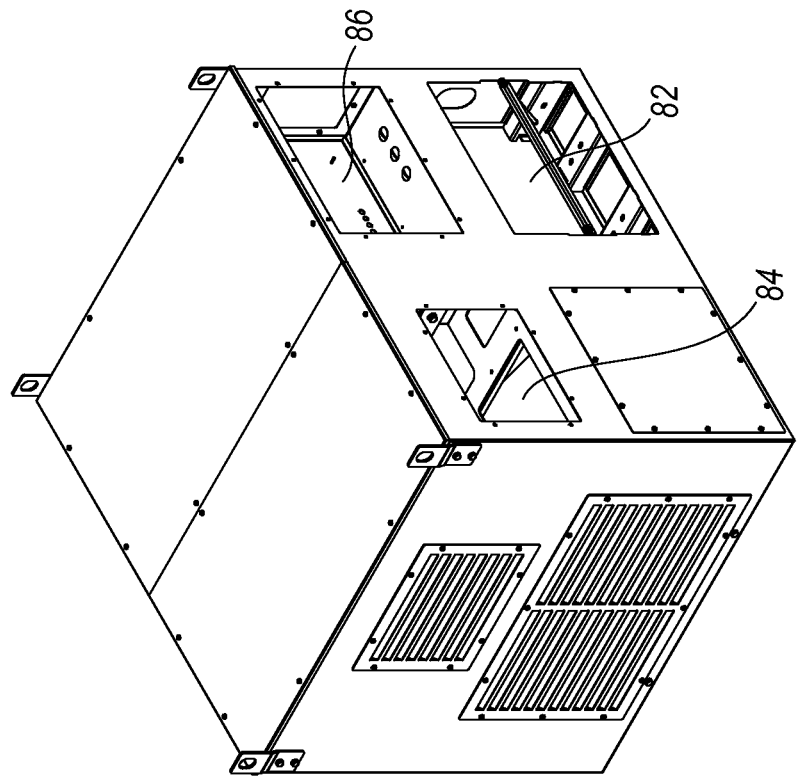
FIG. 3C is a perspective view of the assembled outlet box of FIG. 3A showing the interior compartments of the outlet box.
Figure 3B:
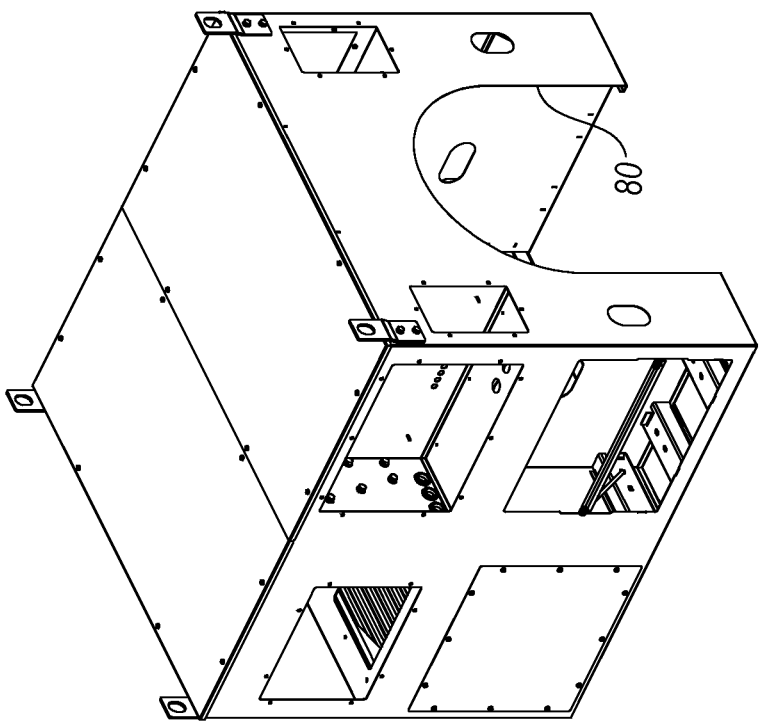
FIG. 3B is a perspective view of the assembled outlet box of FIG. 3A, showing the back panel of the outlet box.
Figure 4:
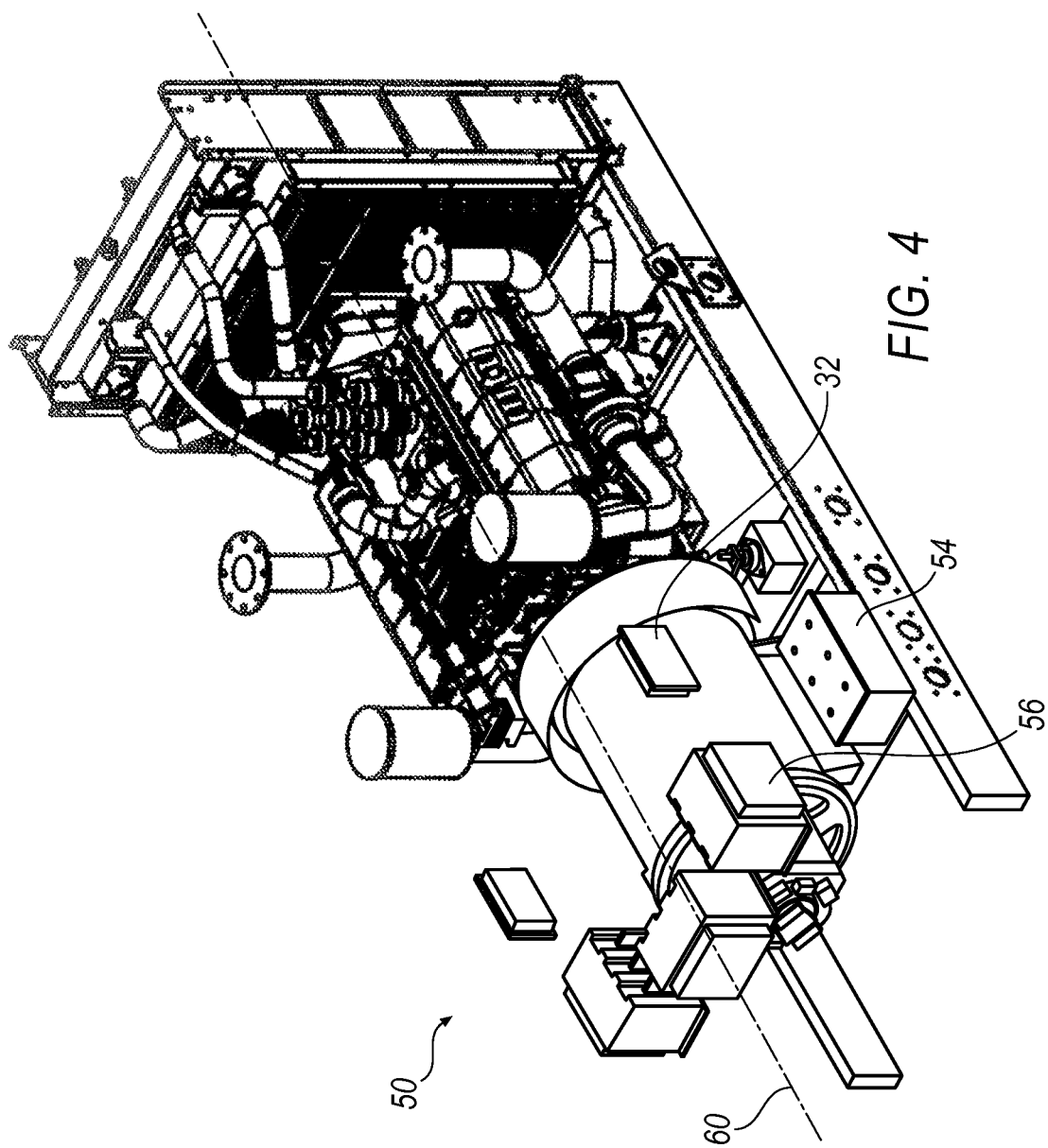
FIG. 4 is a schematic representation of the power generation aggregate of FIG. 2 showing the outlet box in dotted lines and detailing the orientation of the accessories, switches and governor.

FIG. 3B is a perspective view of the assembled outlet box of FIG. 3A, showing the arched aperture 80 in the front panel of the box adapted to accommodate at least a portion of the housing of the generator aggregate such that a portion of the generator aggregate is within the interior space of the outlet box. FIG. 3C illustrates another view of the assembled outlet box of FIG. 3A, showing the compartments 82 for the battery, 86 for the governor switch and 84 for accessory switches.

While the embodiments as described have been set forth, it is understood that the words used herein are words of description, and not words of limitation. Many variations and modification will be apparent to those of ordinary skill in the art and are not to be construed as limiting the scope of the invention as set forth in the appended claims.

We claim:

1. A vibration dampened power generation aggregate, comprising:
   a frame defining a first side and a second side, said frame comprised of longitudinal members having a length and oriented in a first direction; said frame further comprising at least one transverse member extending in a second direction between said longitudinal members; said frame supported by frame bearings and equipped with aggregate bearings supported on a vibration dampening material to insulate said aggregate bearings from said frame; said aggregate bearings and said frame bearings disposed vertically relative to each other and further equipped with vibration dampening material interposed between said frame bearings and said aggregate bearings; and
   a power generation aggregate comprising an internal combustion engine mounted on at least some of said aggregate bearings; said engine operable to impart rotary motion to an electrical generator coupled to said engine; said generator mounted on at least some of the aggregate bearings; and an outlet box having a front panel and back panel in spaced apart relation relative to each other and having opposed sidewall panels extending substantially there between to define an interior space; at least one of said outlet panels having an aperture therein to admit at least a part of said generator into said interior space; said outlet box mounted on at least some of said aggregate bearings; said outlet box interior space further divided into compartments for placement of accessories, switches and governors for the power generation aggregate; said power generation aggregate mounted on said frame such that said power generation aggregate has a mass substantially evenly distributed between said first side and said second side along substantially the length of said frame to substantially reduce oscillation and sound transmission of said power generation aggregate on said frame during aggregate operation.

2. The vibration dampened power generation aggregate of claim 1, wherein said aggregates are oriented on said frame in said first direction.

3. The vibration dampened power generation aggregate of claim 1, wherein said outlet box has an upper level and a lower level divided into multiple compartments in said interior space, said compartments accessible from said panels.

4. The vibration dampened power aggregate system of claim 1, wherein said accessories, switches and governors are arranged in said outlet box compartments such that said outlet box mass is evenly distributed between said first side and said second side.

5. The vibration dampened power aggregate of claim 1, further including a top panel and a bottom panel in spaced apart relation to each other oriented respectively on a top and bottom of said outlet box to define an enclosed interior space.

6. The vibration dampened power aggregate of claim 1, wherein said outlet box compartments are equipped with removable panels to provide access to said compartments.

7. The vibration dampened power aggregate of claim 3, wherein said accessories include a battery for starting said engine; said battery compartment oriented on said lower level; said battery on a floor panel in said compartment resting upon an aggregate bearing along a longitudinal member of said frame.

8. The vibration dampened power aggregate of claim 1, wherein said back panel on said outlet box is equipped with a vent to provide ventilation for said outlet box.

9. An outlet box in combination with a power generation aggregate, comprising a front panel and a back panel in spaced apart relation to each other, opposed side panels in opposition to each other and extending between said front and back panel to define an interior space; said front panel equipped with an aperture to admit at least a part of a power generation aggregate to said interior space; said side panels further equipped with at least one compartment for accessories, power switches and governor switches to be positioned in said outlet box such that said outlet box center of mass is evenly distributed along a first side and a second side of a vibration frame; said outlet box mounted upon a vibration frame supported by frame bearings and equipped with aggregate bearings supported on a vibration dampening material to insulate said aggregate bearings from said frame; said aggregate bearings and said frame bearings disposed vertically relative to each other and further equipped with vibration dampening material interposed between said frame bearings and said aggregate bearings with vibration dampening material interposed between said frame bearings and said aggregate bearings.

10. The outlet box of claim 9, wherein said outlet box has an upper level and a lower level divided into multiple compartments in said interior space, said compartments accessible from said panels.

11. The outlet box of claim 9, wherein said accessories include a battery for starting said engine; said battery compartment oriented on a lower level; said battery on a floor panel in said compartment resting upon an aggregate bearing along a longitudinal member of said frame.

12. The outlet box of claim 9, wherein said power generation aggregate at least partially admitted into said interior space is a generator.

13. The outlet box of claim 9, wherein said back panel on said outlet box is equipped with a vent to provide ventilation for said outlet box.

14. The outlet box of claim 9, further including a top panel and a bottom panel in spaced apart relation to each other oriented respectively on a top and bottom of said outlet box to define an enclosed interior space.

\* \* \* \* \*